United States Patent [19]
Abbott et al.

[11] 3,755,166
[45] Aug. 28, 1973

[54] GREASE SEALANT

[75] Inventors: William J. Abbott, Ypsilanti, Mich.;
George L. Rathfon, Bradford, Pa.

[73] Assignee: Witco Corporation, New York, N.Y.

[22] Filed: June 28, 1972

[21] Appl. No.: 266,889

[52] U.S. Cl. .................. 252/11, 106/33, 252/21, 252/28, 252/72
[51] Int. Cl. .................. C10m 5/14, C10m 7/24
[58] Field of Search .................. 252/11, 21, 28, 72; 106/33

[56] References Cited
UNITED STATES PATENTS

| | | | |
|---|---|---|---|
| 2,028,155 | 1/1936 | Hodson | 252/21 |
| 2,714,091 | 7/1955 | Puddington et al. | 252/28 |
| 2,850,797 | 9/1958 | Chambers et al. | 252/28 |
| 3,028,334 | 4/1962 | Wilson | 252/21 |
| 3,090,751 | 5/1963 | Scherer et al. | 252/21 |

Primary Examiner—Daniel E. Wyman
Assistant Examiner—I. Vaughn
Attorney—Jordan J. Driks, Albert L. Gazzola et al.

[57] ABSTRACT

A viscous resilient deformable grease composition having a penetration of about 250°–350 at 77°F., which develops a protective skin when exposed to air, comprising a lubricating oil having a viscosity range of 100–250 SSU at 210°F., thickened with an organophylic clay such as dimethyldioctodecyl ammonium montmorillonite, and containing a drying oil such as soya oil and a drier such as cobalt naphthenate. After homogenizing, this composition is an effective sealant, particularly for energy absorbing devices as used in automobile bumpers wherein bleeding of hydraulic fluid and moisture penetration are problems.

8 Claims, No Drawings

GREASE SEALANT

The present invention relates to certain improved skinning sealant compositions comprising a gelled lubricating oil-drying oil mixture which forms a protective skin when exposed to air. Gelling is accomplished with an organophylic clay as hereinafter more fully described.

The present composition when used in combination with a rubber seal provides an effective sealant for hydraulic fluids at elevated pressures of 150–200 p.s.i.g. or even more, and resists penetration by water. It is deformable and resilient and regains sealable engagement within a hydraulic energy absorbing device even after prolonged use of the device. The present composition is effective in sealing whatever fluid which may leak past the rubber seal.

The gelling of organic fluids with an organophylic montmorillonite wherein the inorganic cation is replaced with a long chain secondary amine salt is known. Lubricating greases prepared from such modified montmorillonites (Bentones) are found in an article by J. W. Jordon, Journal of Physical and colloid Chemistry, Vol. 53, No. 2, 1949, Pages 294–306.

The combination of a mineral or synthetic lubricating oil, containing a drying oil, with a solid hydrophylic absorbent material, wherein the drying oil is polymerized in situ, is well known. Such a composition and process is described in the U.S. Pat. No. 2,714,091, issued July 26, 1955 to Paddington et al, which is incorporated herein by reference. Essentially this patent teaches a process for making a grease using a solid hydrophylic finely divided, low bulk density, absorbent material such as a silica aerogel, suspended in a mixture of lubricating oil and a drying oil. When a sealant composition is prepared using silica aerogel, for instance, according to the teachings of this patent, the composition fails to form an acceptable seal when used in a hydraulic energy absorbing device coacting with an automobile bumper.

According to the present invention, an effective sealant for hydraulic fluids for energy absorbing devices is made available, comprising a mixture of (1) certain organophylic modified montmorillonite gelling agents, (2) a mineral or synthetic lubricating oil (3) a drying oil dried in situ using a suitable drying agent, and (4) preferably containing a dispersant.

Although the lubricating oil in the present composition can be either a mineral or synthetic lubricating oil, mineral oils, because of availability and economy, are preferred. For instance, mineral oils such as solvent refined midcontinent bright stock, Pennsylvania stock, and generally any refined petroleum lubricating oil having a viscosity in the range of about 100 to 250 SUS at 210°F., can be used in the present composition. It is preferred to use one having a viscosity of about 150 SUS at 210°F., for best results, i.e. to provide the most effective sealant for long term use. An oil having a flash point of more than about 300°F. is also preferred because of the safety factors involved.

Although not preferred, synthetic lubricating oils such as glycol esters, polybutenes, polyphenol ethers, silicones, and the like may be used in the present composition.

The drying oils which are used in the present composition can be degummed soya oil, tung oil, and the like, are well known in the art, and require no further description herein. Mixtures of drying oils can be used. Soya oil because of its ready availability, its low cost, and because it tends to surface-dry more effectively, is preferred.

Of the well known driers, such as cobalt naphthenate, manganese naphthenate, manganese phthalate, and the like, cobalt naphthenate is preferred particularly for use with soya oil because it promotes fast skinning. The amount of drier added is an amount sufficient to dry the oil effectively as known in the art, i.e., when using cobalt naphthenate, for instance, an amount providing about 0.05–0.15 percent cobalt in the final composition is satisfactory. More or less can be used at the risk of slowing down the skin formation when using less, and when using an amount approaching and over about 0.15 percent, no contributing or additional effect is seen. Thus when using the standard commercial, cobalt naphthenate solution containing 6 percent cobalt, about 2 ml. containing about 0.12 g. cobalt is a preferred amount in 100 grams of total composition.

As the gelling agent with organophylic properties, certain modified montmorillonites are used as is described in an article by J. W. Jordon in the Journal of Physical and Colloid Chemistry, supra. Organophylic montmorillonites are generally referred to as "Bentones" and are prepared by hydrating a montmorillonite in a very dilute dispersion; purifying by supercentrification to achieve complete removal of non-clay impurities; and replacing the inorganic cations of the montmorillonites with organic cations. For purposes of this invention, the organic cation is a long chain quaternary ammonium salt having more than about 12 carbon atoms to insure strong organophylic properties. Quaternary ammonium salts having two long chains, i.e. 16 to 18 carbon atoms each, yield a completely organophylic Bentone, and are preferred. They are prepared for instance, by reacting hydrated montmorillonite with a secondary fatty amine such as technical distearyl amine, as known in the art.

In a preferred embodiment, a dispersant may be added to the present composition, and the mixture thoroughly stirred to promote dispersion of the gelling agent. Dispersants such as methanol, acetone, propylene carbonate, and the like, may be used as known in the art. Methanol is preferred because it is relatively inexpensive, easily available and very effective.

Rust preventing additives such as sodium nitrite, calcium petroleum sulfonate, zinc chromate, as known in the art, are preferably included in the present composition.

The present compositions having a penetration range of about 250–350 at 77°F., are generally effective as high pressure sealants, and those having a penetration range of about 300–325 at 77°F. are preferred to prevent leaking of the hydraulic fluid and to maintain a water tight seal in energy absorbing devices particularly those used in automobile bumpers. In addition this skinned product provides effective protection from dirt and grime penetration.

The lubricating oil of the present composition is generally present in major quantities, i.e., of about 50 percent by volume or better. The amount of drying oil such as soya oil is preferred at less than about 30 percent and in the range of about 20–30 percent, because quantities of over 30 percent promote hardening of the entire mass which is detrimental to the sealing properties of the present composition. A quantity of as little as 15 percent can be used and about 25 percent being preferred, to produce the skinned sealant of the present invention. A suitable drier as mentioned above, is used with the drying oil as known in the art.

The drying oil forms a skin on the surface after exposure to air for about 24 hours, or more, depending on the quantity and kind of drying oil utilized. For instance, about 25 percent soya oil in the present composition, dried with cobalt naphthenate, will form a skin after about 24 hours exposure to air at room temperature.

Generally, the compositions of the present invention are prepared by combining the lubricating oil with drying oil and drier at slightly elevated temperatures, i.e., about 145°–150°F. as known in the art. The Bentone is added, and after mixing throughly, the dispersant is added with continued mixing. The final product is preferably sheared through a homogenizing device such as a colloid mill, roll mill, high pressure homogenizer, or sonic homogenizer, as known in the art, and thereafter is used directly or packaged until ready for use.

The present sealant composition is applied in an energy absorbing device where bleeding might occurr, i.e., at a point where an O-ring or other type outer seal is used and from which hydraulic fluid tends to leak not only when the device is activated by impact, but also when at rest, i.e., under pressure of the hydraulic fluid, and where moisture or dirt may penetrate. The sealant, for instance, is introduced by pressure gun into the annulus between an outer O-ring and the atmosphere.

The following examples are intended to illustrate the present invention and are not intended to be limiting thereto.

EXAMPLE I

Fifty-two parts by weight of midcontinent bright stock lubricating oil having a viscosity of 150 SUS at 210°F. is mixed with 25 parts by weight of degummed soya oil and two parts by weight of cobalt (6 percent) naphthenate, (0.12 percent cobalt). The mixture is heated to 145°F. and 20 parts by weight of Bentone-34 (National Lead Company, a bentonite clay which has been treated with a proportion of dimethyl dioctadecyl ammonium chloride) is added and mixed throughly, and then 6 parts by weight of methanol is added with continued mixing. The final product is homogenized through a high pressure orifice such as through a sonic homogenizer. The product has an unworked penetration at 77°F. of 295; 314 after 60 strokes. Upon exposure to air at 75°F. it forms a skin within 24 hours.

EXAMPLE 2

The above product is used as a sealant in energy absorbing devices intended for automobile bumpers. It is introduced under pressure between the physical outer seal (O-ring) and the atmosphere. The hydraulic fluid, under 150 psig in the energy absorbing devices, does not bleed out even after actuating by impact for 10 times. After field trials, there is no evidence of dirt or moisture having penetrated inside the units.

EXAMPLE 3

In energy absorbing devices as in Example 2, not sealed with the compound of the present invention, bleeding of the hydraulic fluid under 150 psig persisted rendering the device unacceptable.

Thickening agents such as siliceous materials, ferric oxide, asbestos, fiberglass, and the like, are not operable in the present invention and are not intended to be included in the present scope.

Having thus described our invention we claim:

1. A sealant grease composition for hydraulic fluids in energy absorbing devices comprising a major proportion of lubricating oil, thickened to a grease consistency with a minor thickening amount of an organophylic bentonite clay and containing from about 15 to about 30 percent of a drying oil selected from the group consisting of soya oil and tung oil and a minor drying amount of a drier selected from the group consisting of cobalt naphthenate, magnanese naphthenate, and manganese phthalate, said sealant having a penetration range of about 250–350 at 77°C.

2. A sealant composition as in claim 1 wherein the drying oil is soya oil and the drier is cobalt naphthenate.

3. A sealant composition as in claim 1 wherein the clay thickener is dimethyldioctadecyl quaternary ammonium bentonite.

4. A sealant composition as in claim 1 to which a a minor dispersing amount of a dispersing agent selected from the group consisting of methanol, acetone, and propylene carbonate is added.

5. A sealant composition as in claim 4 in which the dispersant is methanol.

6. A sealant composition as in claim 1 in which the lubricating oil is a bright stock lubricating oil having a viscosity of about 150 SUS at 210°F.

7. A sealant composition as in claim 4 comprising about 50 parts by weight of a mineral lubricating oil, about 20–30 parts of a drying oil, a minor drying amount of a drier, about 25 parts of the clay thickener, and a minor dispersing amount of a dispersant.

8. A sealant composition as in claim 4 comprising a mixture of about 52 parts by weight of a bright stock lubricating oil, about 25 parts by weight of degummed soya oil, about 2 parts by weight of a cobalt naphthenate solution containing 6 percent cobalt, about 20 parts by weight of the clay thickener, and about 6 parts by weight of methyl alcohol, said sealant having a penetrating range of 300–325 at 77°F.

* * * * *

UNITED STATES PATENT OFFICE
CERTIFICATE OF CORRECTION

Patent No. 3,755,166          Dated August 28, 1973

Inventor(s) William J. Abbott et al.

It is certified that error appears in the above-identified patent and that said Letters Patent are hereby corrected as shown below:

Column 1, under "Assignee", after "Witco" insert -- Chemical --.

Column 2, line 6, delete "phthalate" and insert -- tallate --.

Column 4, line 21, after "oil" should read -- by weight --;

Column 4, line 25, delete "phthalate" and insert -- tallate --.

Signed and sealed this 19th day of March 1974.

(SEAL)
Attest:

EDWARD M. FLETCHER, JR.
Attesting Officer

C. MARSHALL DANN
Commissioner of Patents